US010809205B2

(12) United States Patent
Wynne et al.

(10) Patent No.: US 10,809,205 B2
(45) Date of Patent: Oct. 20, 2020

(54) DETECTION OF 3D PRINTING FAILURE USING IMAGING

(71) Applicant: Intrepid Automation, San Diego, CA (US)

(72) Inventors: Ben Wynne, Escondido, CA (US); Jamie Lynn Etcheson, San Diego, CA (US); Christopher Sean Tanner, San Diego, CA (US); Robert Lee Mueller, San Diego, CA (US); Ivan Dejesus Chousal, Chula Vista, CA (US)

(73) Assignee: Intrepid Automation, San Diego, CA (US)

(*) Notice: Subject to any disclaimer, the term of this patent is extended or adjusted under 35 U.S.C. 154(b) by 43 days.

(21) Appl. No.: 16/421,189

(22) Filed: May 23, 2019

(65) Prior Publication Data

US 2020/0033270 A1 Jan. 30, 2020

Related U.S. Application Data

(60) Provisional application No. 62/711,438, filed on Jul. 27, 2018.

(51) Int. Cl.
*G01N 21/90* (2006.01)
*G01N 21/88* (2006.01)
*B33Y 50/00* (2015.01)
*G06T 7/00* (2017.01)
(Continued)

(52) U.S. Cl.
CPC .......... *G01N 21/90* (2013.01); *B29C 64/386* (2017.08); *B33Y 50/00* (2014.12); *G01N 21/8851* (2013.01); *G06T 7/001* (2013.01); *B29C 64/135* (2017.08); *G06T 2207/10048* (2013.01)

(58) Field of Classification Search
CPC .......... B22F 2003/1056; B22F 2999/00; B22F 2203/00; B22F 2203/03; B22F 2003/1057; B22F 2202/11; B22F 3/1055; B33Y 50/02; B33Y 30/00; B33Y 40/00; B33Y 50/00; B23K 26/032; B23K 26/0876; B23K 26/342; B23K 26/36; B29C 64/153; B29C 64/268; B29C 64/393; G01B 11/30; G05B 15/02; G05B 19/4099; G05B 2219/45167;
(Continued)

(56) References Cited

U.S. PATENT DOCUMENTS

2017/0341183 A1* 11/2017 Buller .................. B29C 64/268
2018/0186081 A1* 7/2018 Milshtein ............ B28B 17/0081
2018/0186082 A1* 7/2018 Randhawa ............. B33Y 50/02
(Continued)

*Primary Examiner* — Christopher S Kelley
*Assistant Examiner* — Asmamaw G Tarko
(74) *Attorney, Agent, or Firm* — MLO, a professional corp.

(57) ABSTRACT

Apparatuses and methods for detecting failures in a photoreactive 3D printing system include a light-emitting device configured to emit light into and along a plane of a membrane or of a substrate below the membrane. The membrane is a bottom surface of a resin tub. The light has a wavelength that is different from a photopolymerization wavelength of resin in the resin tub. The membrane or substrate is transparent to the wavelength of the light and to the photopolymerization wavelength. An imaging device is oriented to capture an image of the light emitted from the membrane or the substrate. A detection system is in communication with the imaging device, the detection system being configured to detect a spatial or temporal disruption in the image.

20 Claims, 11 Drawing Sheets

(51) Int. Cl.
*B29C 64/386* (2017.01)
*B29C 64/135* (2017.01)

(58) Field of Classification Search
CPC .......... G05B 2219/49023; G06F 30/20; H04N 1/603; Y02P 10/25; Y02P 10/295
USPC .......................................................... 348/86
See application file for complete search history.

(56) References Cited

U.S. PATENT DOCUMENTS

2018/0194075 A1* 7/2018 Hardee .............. H04N 1/00827
2019/0388967 A1* 12/2019 Makinen ................ G06F 3/121

* cited by examiner

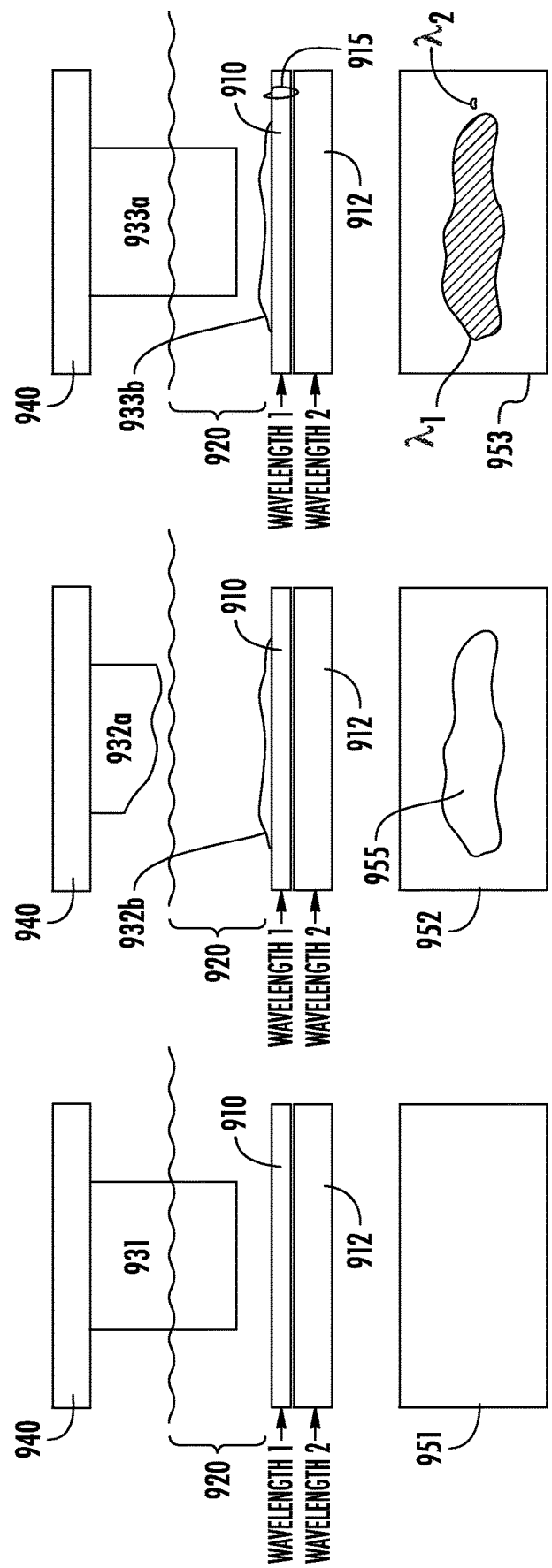

DETECTION OF 3D PRINTING FAILURE USING IMAGING

RELATED APPLICATIONS

This application claims priority to U.S. Provisional Patent Application No. 62/711,438, filed on Jul. 27, 2018 and entitled "Detection of 3D Printing Failure Using Imaging"; the contents of which are hereby incorporated by reference.

BACKGROUND

There are many types of additive manufacturing (i.e., 3D printing) systems and methods. One method utilizes photosensitive polymers (i.e., photopolymers) that cross-link and harden from a liquid resin to a solid polymeric material upon exposure to light. These photoreactive 3D printing systems typically include a resin pool, an illumination system, and a print platform, where the illumination system projects an image (i.e., pattern) into the resin pool causing a layer of a polymeric object to be formed on the print platform. The print platform then moves the printed layer out of the focal plane of the illumination system, and then the next layer is exposed (i.e., printed).

In some systems, the resin pool is held in a resin tub, which has a membrane at the bottom through which light from the illumination system is projected. The membrane is exposed to stresses such as heat from the resin pool, tension from the printed object as the object is pulled from the resin pool, and natural deterioration of the membrane material over time. Resin leaks through the membrane can cause damage to components of the 3D printing system, such as to sensitive electronics that may be located below the resin tub. Conventional solutions for resin leaks include providing catch trays, covering sensitive electronics, using software to analyze the time it takes to fill the resin tub via fluid level sensors and pump time, or placing leak detection sensors on the floor that the 3D printing machines are located on.

SUMMARY

In some embodiments, a failure detection apparatus for a photoreactive 3D printing system includes a light-emitting device configured to emit light into and along a plane of a membrane. The membrane is a bottom surface of a resin tub. The light has a wavelength that is different from a photopolymerization wavelength of resin in the resin tub, and the membrane is transparent to the wavelength of the light and to the photopolymerization wavelength. An imaging device is oriented to capture an image of light emitted from the membrane. A detection system is in communication with the imaging device, the detection system being configured to detect a spatial disruption or a temporal disruption in the image.

In some embodiments, a failure detection apparatus for a photoreactive 3D printing system includes a substrate below a membrane of a resin tub, where the membrane is a bottom surface of the resin tub. A light-emitting device is configured to emit light into and along a plane of the substrate. The light has a wavelength that is different from a photopolymerization wavelength of resin in the resin tub. The substrate is transparent to the wavelength of the light and to the photopolymerization wavelength. An imaging device is oriented to capture an image of light emitted from the substrate. A detection system is in communication with the imaging device, the detection system being configured to detect a spatial disruption or temporal disruption in the image.

In some embodiments, a method for detecting failures in a photoreactive 3D printing system includes providing a light-emitting device configured to emit light into and along a plane of a substrate. The substrate is mounted onto or below a resin tub. The light has a wavelength that is different from a photopolymerization wavelength of resin in the resin tub, and the substrate is transparent to the wavelength of the light and to the photopolymerization wavelength. The method also includes providing an imaging device oriented to capture an image of light emitted from the substrate, and providing a detection system in communication with the imaging device. The detection system is configured to detect a spatial disruption or a temporal disruption in the image.

BRIEF DESCRIPTION OF THE DRAWINGS

FIGS. 9A-9C shows schematics of using multiple wavelengths, one for the membrane and one for a separate substrate, in accordance with some embodiments.

DETAILED DESCRIPTION

The present embodiments provide devices and methods for detecting failures in a 3D printing system, such as failure of a resin tub membrane or failure of 3D-printed parts. Resin leaks can be detected in an efficient and quick manner, before any resin is spilled onto sensitive electronics below. Conventional solutions as described above are primarily only able to detect major leaks, which results in messy spills, wasted resin material, and possibly damage to the 3D printer. The embodiments described in this disclosure are able to identify small or large leaks and enable early detection by capturing images of a lighted substrate and detecting changes in the images.

Light is emitted into a substrate such that the light is substantially contained in a coplanar manner when a surface of the substrate is free of disturbances. An imaging device (e.g., camera, photodetector) positioned under the substrate captures images of the substrate surface, and the images are analyzed by a host or processing system. When a membrane leak occurs, resin or other 3D print material falls onto the surface of the substrate resulting in a disruption to the previously contained light. Such disruption in light is captured by the imaging device and is identified as a "hot spot" by a detection system to infer the presence of a failure such as a resin leak. The information provided by the imaging device can also be used to assist in the determination of leak position or location. The present embodiments apply to any 3D printing application that requires the use of a resin polymer interface also known as a membrane.

Figure 1A:
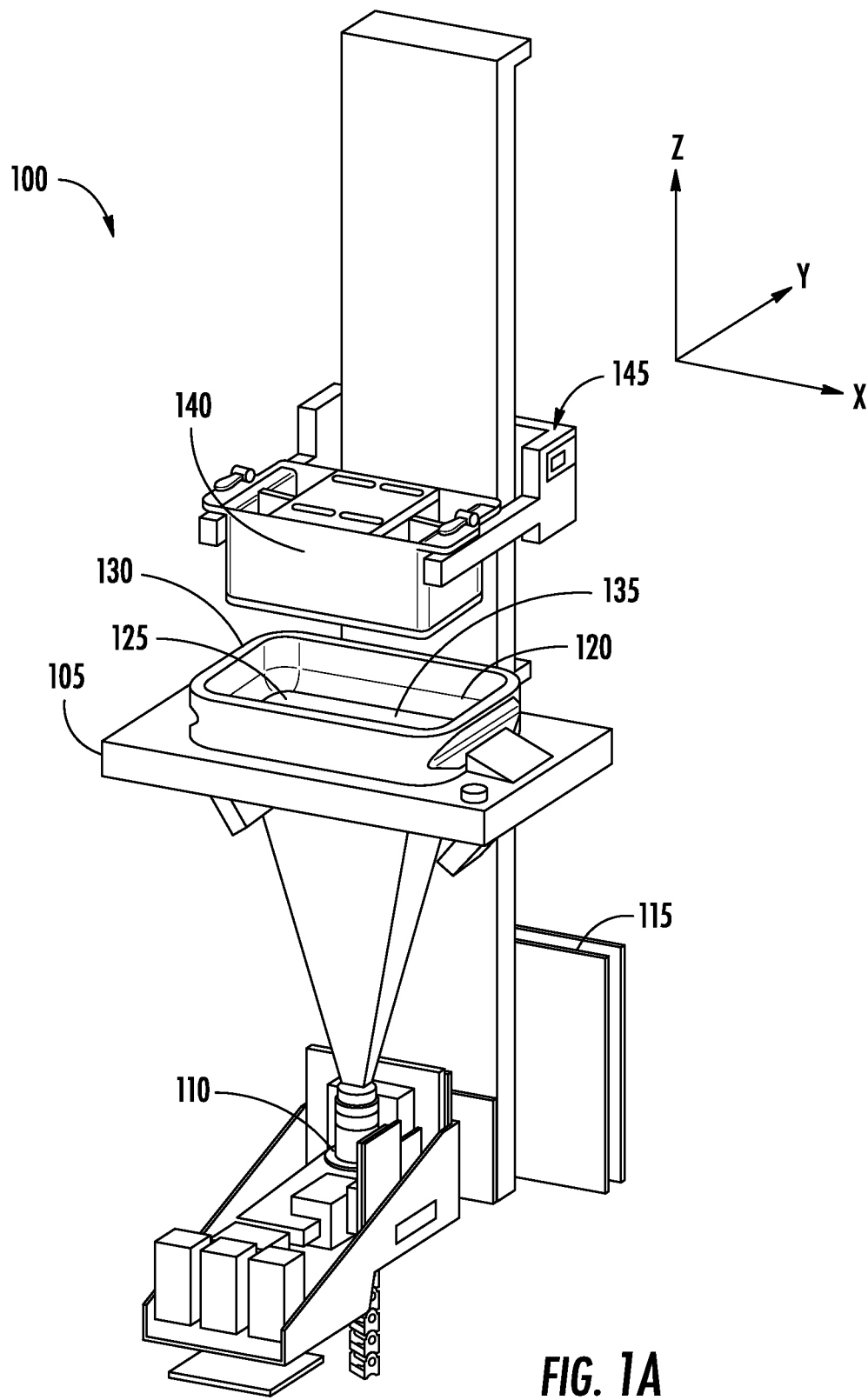
FIGS. 1A-1B are simplified perspective views of a photoreactive 3D printing systems (PRPS), in accordance with some embodiments.
Figure 1B:
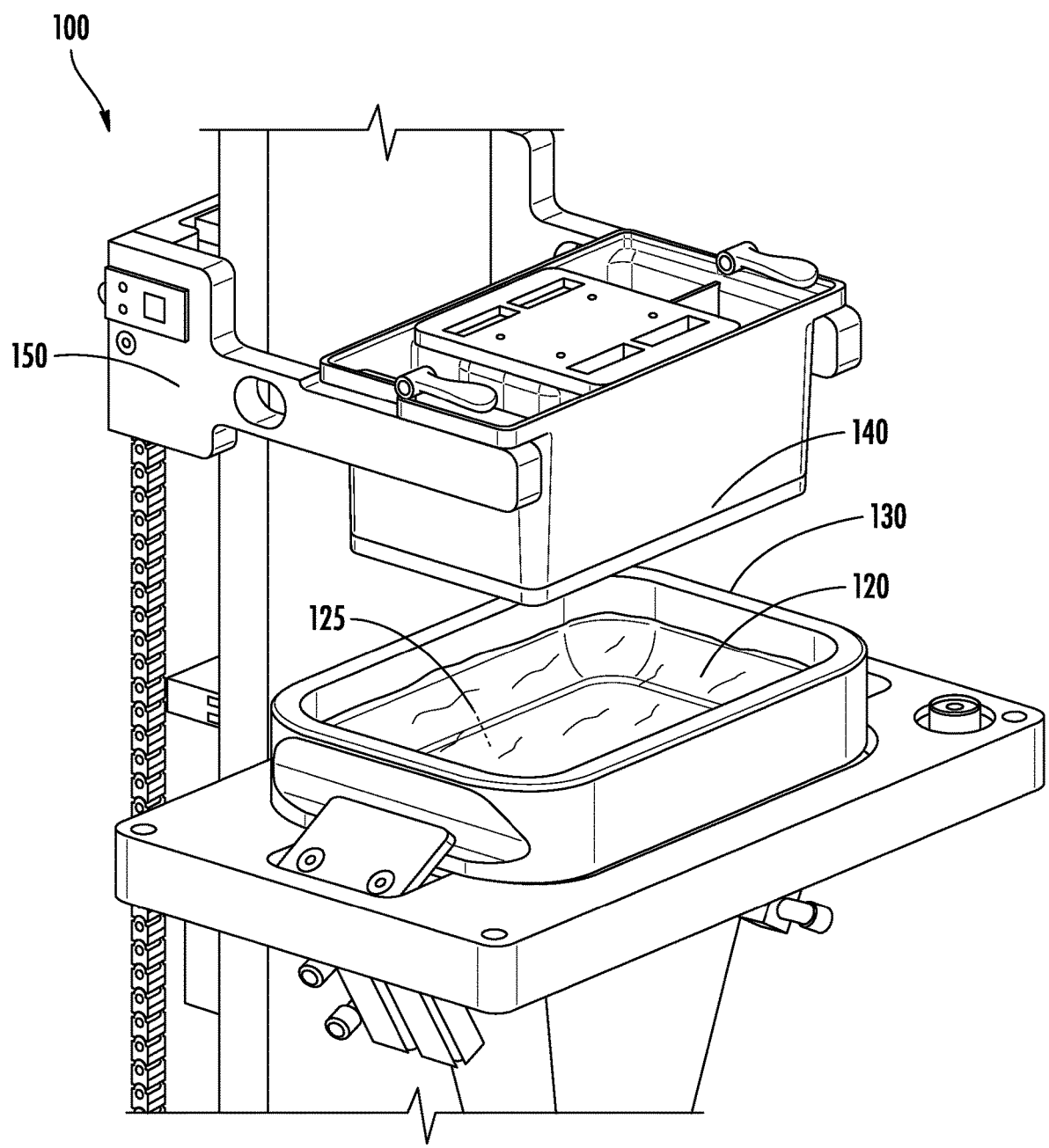

FIGS. 1A-1B illustrate an example of a photoreactive printing system 100 (PRPS), in accordance with some embodiments. The PRPS 100 shown in FIGS. 1A-1B contains a chassis 105, an illumination system 110, an image display system 115, a resin pool 120, a polymer interface 125, a resin tub 130, a membrane 135, a print platform 140, an elevator system 145 and elevator arms 150.

The chassis 105 is a frame to which some of the PRPS components (e.g., the elevator system 145) are attached. In some embodiments, one or more portions of the chassis 105 are oriented vertically, which defines a vertical direction (i.e., a z-direction) along which some of the PRPS components (e.g., the elevator system 145) move. The print platform 140 is connected to the elevator arms 150 (FIG. 1B), which are movably connected to the elevator system 145. The elevator system 145 enables the print platform 140 to move in the z-direction. The print platform 140 can thereby be lowered into the resin pool 120 to support the printed part and lift it out of the resin pool 120 during printing.

The illumination system 110 projects a pattern through the membrane 135 into the resin pool 120 that is confined within the resin tub 130. A build area is an area in the resin pool 120 where the resin is exposed (e.g., to ultraviolet light from the illumination system 110) and crosslinks to form a first solid polymer layer on the print platform 140. Some non-limiting examples of resin materials include acrylates, epoxies, methacrylates, urethanes, silicones, vinyls, combinations thereof, or other photoreactive resins that crosslink upon exposure to illumination. In some embodiments, the resin has a relatively short curing time compared to photosensitive resins with average curing times. In other embodiments, the resin is photosensitive to wavelengths of illumination from about 200 nm to about 500 nm, or to wavelengths outside of that range (e.g., greater than 500 nm, or from 500 nm to 1000 nm). In other embodiments, the resin forms a solid with properties after curing that are desirable for the specific object being fabricated, such as desirable mechanical properties (e.g., high fracture strength), desirable optical properties (e.g., high optical transmission in visible wavelengths), or desirable chemical properties (e.g., stable when exposed to moisture). After exposure of the first layer, the print platform 140 moves upwards (i.e., in the positive z-direction as shown in FIG. 1A), and a second layer can be formed by exposing a second pattern projected from the illumination system 110. This "bottom up" process can then be repeated until the entire object is printed, and the finished object is then lifted out of the resin pool 120.

In some embodiments, the illumination system 110 emits radiant energy (i.e., illumination) over a range of different wavelengths, for example, from 200 nm to 500 nm, or from 500 nm to 1000 nm, or over other wavelength ranges. The illumination system 110 can use any illumination source that is capable of projecting a pattern for printing the 3D part. Some non-limiting examples of illumination sources are arrays of light emitting diodes, liquid crystal-based projection systems, liquid crystal displays (LCDs), liquid crystal on silicon (LCOS) displays, mercury vapor lamp-based projection systems, digital light processing (DLP) projectors, discrete lasers, and laser projection systems.

The example system (PRPS 100) shown in FIGS. 1A-1B is a non-limiting example of an additive manufacturing system. Other PRPSs can be inverted with respect to the system shown in FIGS. 1A-1B. In such "top down" systems, the illumination source is above the resin pool, the print area is at the upper surface of the resin pool, and the print platform moves down within the resin pool between each printed layer. The failure detection apparatuses disclosed herein are applicable to any PRPS configuration, including inverted systems. In some cases, the arrangement of the components described herein can be changed to accommodate a different PRPS geometry, such as to have components move with the resin pool for a top down system, without changing the fundamental operation of the apparatuses and methods disclosed herein.

Figure 2A:
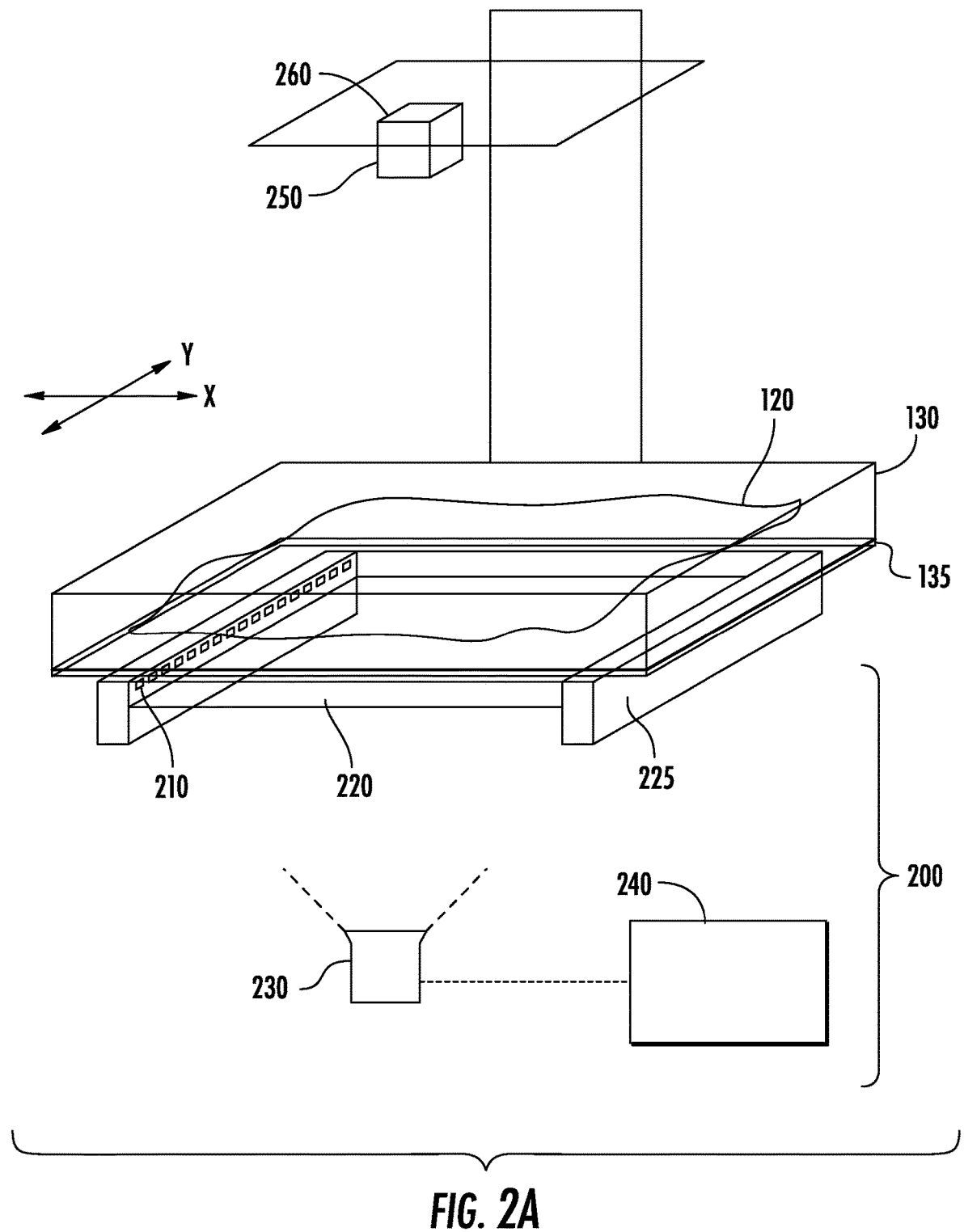
FIG. 2A is a perspective view of a schematic of a failure detection apparatus, in accordance with some embodiments.

FIG. 2A is a schematic showing a perspective view of a failure detection apparatus 200, in accordance with some embodiments. Portions of a PRPS system are also shown, including a resin pool 120 in a resin tub 130 which has an attached membrane 135. The membrane 135 serves as a bottom surface of the resin tub 130 and is transparent to the resin activation wavelength. A 3D-printed part 250 that was printed from the resin is shown on the underside of a build tray 260, above the resin tub 130 (note, figure not drawn to scale).

The failure detection apparatus 200 includes a light-emitting device 210, a substrate 220, an imaging device 230, and a detection system 240. In some embodiments, the light-emitting device 210 is an array of infrared (IR) light-emitting diodes (LEDs). The substrate 220 is transparent to the wavelength of light required to cure the resin, which is the wavelength being projected by the illumination system. In other embodiments, other wavelengths of light can be utilized by light-emitting device 210, such as visible colors produced by red-green-blue (RGB) LEDs, with the condition that the wavelength must be different from a photopolymerization wavelength of the illumination system (FIG. 1A) that causes curing of the resin in the resin tub. Accordingly, other types of light sources, such as lasers, with narrow wavelength emission spectra to avoid interaction with the PRPS pattern wavelength can be used instead of LEDs in light-emitting device 210. The imaging device 230 is able to sense the wavelength of light being emitted by light-emitting device 210 and is oriented to capture an image of the light emitted from the substrate 220. That is, the imaging device 230 captures an image of the lighted substrate 220, by capturing light that is emitted from the substrate. For example, the imaging device 230 may be an IR imaging camera to capture the IR light from the IR LED array of light-emitting device 210. The detection system 240 may be embedded within or be separate from imaging device 230, and is used to analyze images from the imaging device 230.

The substrate 220 is supported by substrate holder 225 and is positioned below the membrane 135 so that any resin leaking through the membrane 135 will be caught by the substrate 220. The substrate 220 may be, for example, a glass sheet or may be any material that enables a distribution of light across its surface. Examples of materials for substrate 220 include but are not limited to fluoropolymers, polycarbonates, and glass, where the substrate materials can be coated or uncoated. Examples of coatings include but are not limited to: dielectric coatings to selectively reflect or transmit specific wavelengths of energy; oleophobic and hydrophobic coatings to reduce smudging and make the substrate easier to clean; and coatings for scratch resistance. In some embodiments, the plane of the substrate 220 (i.e., primary, flat, sheet plane in the X-Y plane of FIG. 2A) has a size that almost as large, or is equal to or greater than the plane of the membrane 135, such that resin leaks that occur anywhere across the membrane 135 or at the edges of the membrane 135 will be caught by the substrate 220.

Figure 2B:
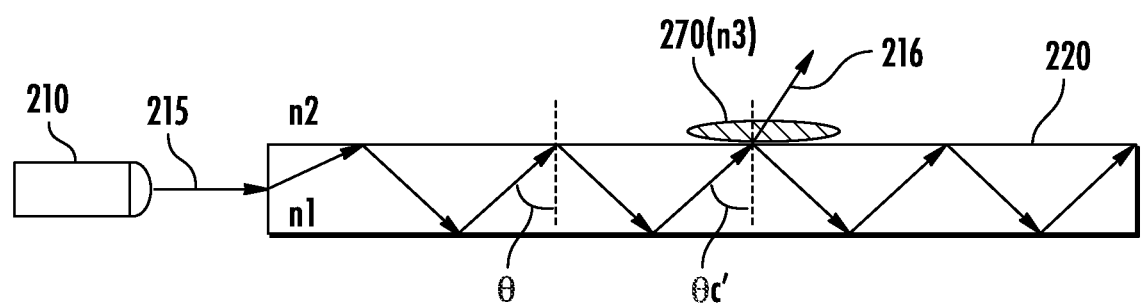
FIGS. 2B-2C are side views of substrates for a failure detection apparatus, in accordance with some embodiments.

FIG. 2B shows a side view of the light-emitting device 210 that emits light 215 into the substrate 220. The substrate 220 has a first index of refraction n1, while its neighboring medium (e.g., air around the substrate) has a second index of refraction n2. Total internal reflection (TIR) occurs when light approaches the boundary of a more optically dense medium to a less dense medium, and the light has an angle of incidence θ that is greater than a critical angle θc. The critical angle is defined by a ratio of the indices of refraction between the material (substrate 220 in this case) and its neighboring medium (e.g., air): θc=arcsin(n2/n1). As shown in FIG. 2B, light 215 emitted by light-emitting device is primarily constrained within substrate 220 due to TIR. However, if the membrane 135 has a defect that allows resin 270 to leak onto substrate 220, light 216 will refract out of the substrate 220 where the resin 270 is located, since resin 270 has a higher index of refraction n3 than air. The refracted light 216 results in a local change in light intensity emitted from the substrate compared to the rest of the surface of substrate 220. This difference in light intensity (e.g., higher intensity) will be captured by the imaging device 240 and detection system 240 (FIG. 2A), indicating the presence of a defect in membrane 135.

Figure 2C:
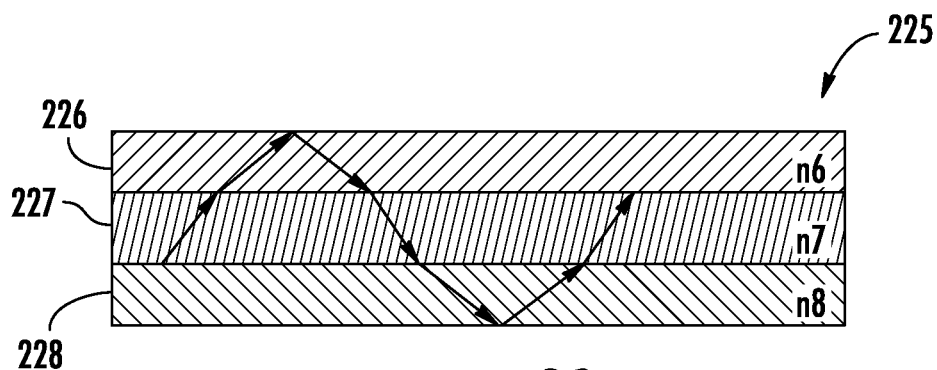

FIG. 2C shows a cross-sectional view of an embodiment of a substrate 225 that is made of multiple layers having different indices of refraction. That is, the multi-layer substrate 225 can be constructed from multiple mediums with different optical densities in order to control the internal reflected light, such as to optimize a signal to noise ratio for the failure detection system. In this embodiment, three layers 226, 227 and 228 having different indices of refraction n6, n7 and n8, respectively, are used for substrate 225, where the index of refraction n7 of middle layer 227 is less than n6 and n8 to cause the light to be refracted in such a way that the light is more effectively confined within the substrate 225. Other numbers of layers and other arrangements of mediums may be used, such as alternating layers instead of three different layers.

Figure 3:
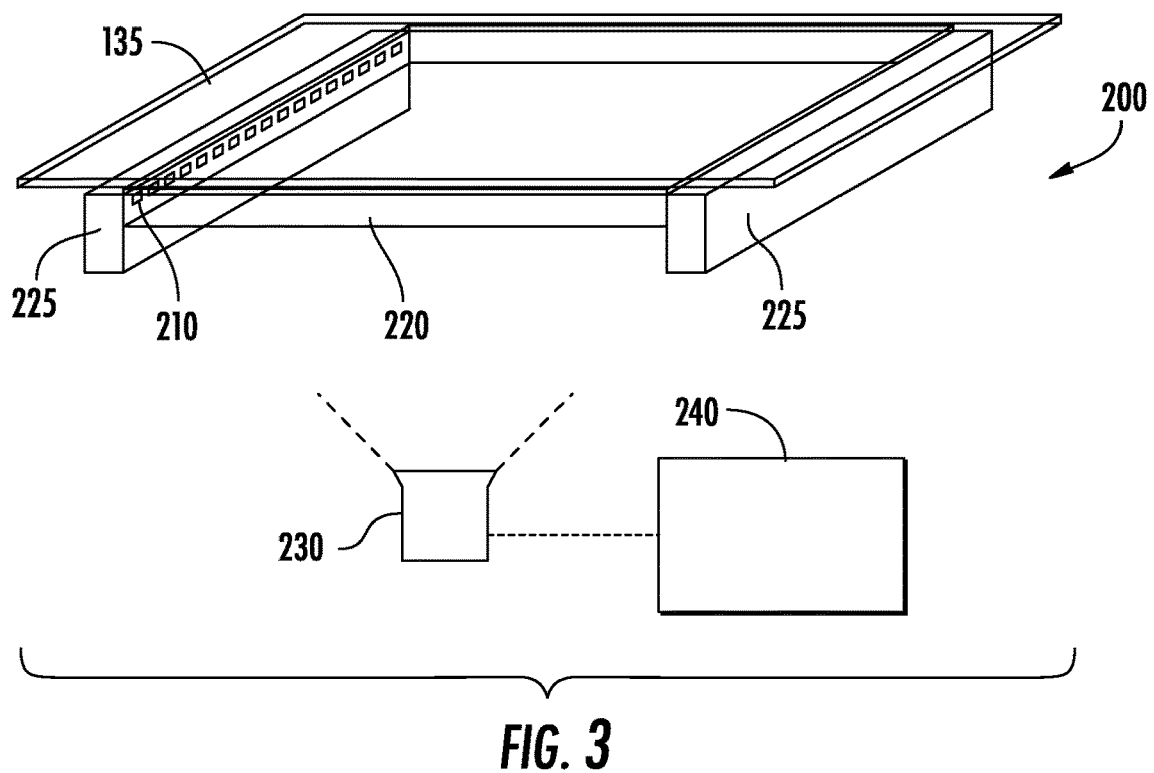
FIG. 3 is a simplified view of the apparatus of FIG. 2A.
Figure 4:
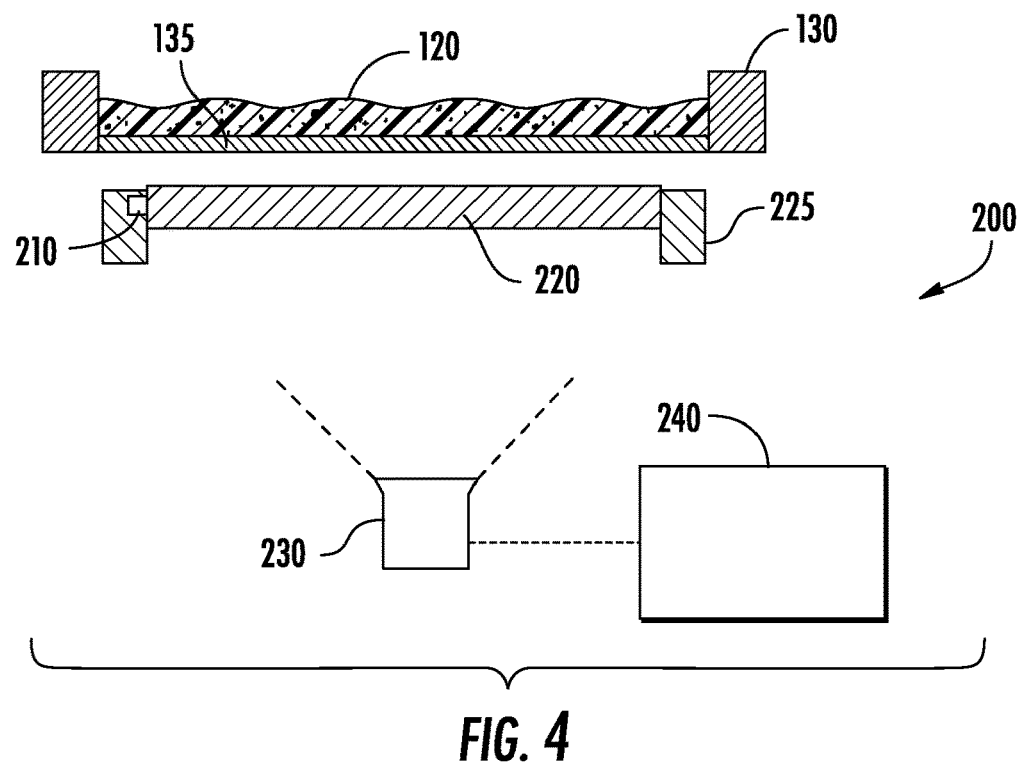
FIG. 4 is a simplified cross-sectional view of another embodiment of the apparatus of FIG. 2A.

FIGS. 3 and 4 are perspective and cross-sectional views, respectively, of embodiments of the failure detection apparatus 200. The light-emitting device 210 is configured to emit light into and along a plane of the substrate 220. The embodiments of FIGS. 3-4 utilize a linear array of IR LEDs, where the LEDs are coupled to, such as embedded in, the substrate holder 225. The edge of the substrate 220 is supported by the substrate holder 225 and placed adjacent to the light-emitting device 210. The substrate holder 225 has two pieces, one on each opposite edge of the substrate 220. The substrate holder 225 spans the full length of the edge of the substrate 220 in this embodiment, to provide illumination of the full area of the substrate. The LEDs are located in only one of the substrate holder pieces (the left-hand piece in this illustration) but could be placed in both pieces of the substrate holder 225 in other embodiments. In FIGS. 3-4, the LEDs are positioned and aimed at the edge of the substrate 220. In other embodiments, the light-emitting device 210 can be configured to have a light source that is located separately from the substrate holder, with a conduit such as a fiber optic cable or optical fiber bundle guiding the light into the edge of the substrate 220.

By projecting light along the plane of the substrate 220, the light emitted from the light-emitting device 210 will primarily be constrained within the substrate 220. In some embodiments, this is because along the planar faces of substrate 220, a difference in index of refraction between substrate 220 the adjacent material (e.g., air or the resin tub membrane 135) causes total internal reflection of light within the substrate 220. Although the light from light-emitting device 210 need not be completely contained within the substrate 220, a majority of the light will remain within the substrate 220. The contained light will have a baseline signature, such as a substantially uniform appearance of the light, across the substrate 220 under normal, leak-free conditions. The planar face of the substrate 220 can be placed directly against the membrane (FIG. 3) or may have a gap spacing it from the membrane (FIG. 4), as long as the presence or absence of contact with the membrane 135 is consistent or can be initially characterized across the surface of the substrate 220.

Figure 5A:
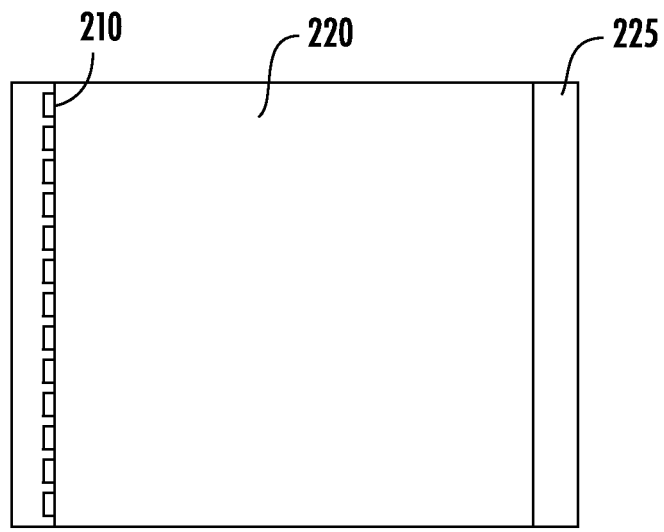
FIGS. 5A-5B are views of an underside of a substrate when a leak is not present or is present, in accordance with some embodiments.
Figure 5B:
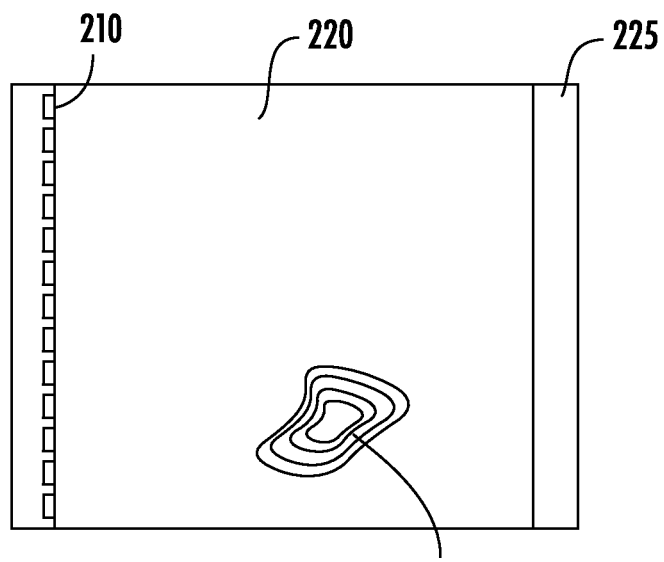

FIGS. 5A-5B are views of the underside of substrate 220 (with light-emitting device 210 and substrate holder 225) as would be seen by imaging device 230 of FIGS. 3-4, demonstrating identification of a failure of the membrane. When resin leaks through the membrane and onto the substrate 220, such as because of a hole or crack in the membrane, the contact between the resin and substrate 220 will change the difference in index of refraction at that location compared to when no resin is on the substrate 220. This is because the resin has a different index of refraction than air, and thus the change in relative indices of a glass/air interface compared to glass/resin will cause a light disruption that will direct some light towards the detector (imaging device 230). Consequently, the light signature across the substrate is disrupted by the presence of resin on the surface of the substrate, and this disruption in uniformity can be detected by the imaging device 230 due to some of the disrupted light being directed at the imaging device 230. In some embodiments, the disruption can be detected as a spatial disruption—that is, an area of non-uniformity, such as in light intensity, compared to the rest of the image. In some embodiments, the disruption can be detected as a temporal disruption where changes in the images over time are identified, such as compared to a baseline light signature. In some embodiments, both spatial and temporal disruptions can be identified.

FIG. 5A shows a non-leak condition, where the light is self-contained within the glass resulting in a uniform image of the light (i.e., no "hot spots") across the substrate 220. In contrast, FIG. 5B shows a condition where a leak has occurred, such as caused by a pinhole or tear in the membrane. The leak results in resin falling on the substrate 220, causing the difference between indices of refraction to change at the interface of the substrate and the leaked resin (vs. the difference in indices of refraction between the substrate and air when no leak is present). Consequently, the previously internally reflected light becomes refracted out of the substrate, causing a hot spot (e.g., having a different intensity of light compared to surrounding areas) in the image captured by the imaging device 230. FIG. 5B shows this hot spot which appears as a non-uniformity or a disruption 290 within the image. The concentric curves shown in disruption 290 represent gradients in light intensity. In some embodiments, images are captured by the imaging device 230 at multiple time points (i.e., moments or instances in time) during a print run, such as at regular intervals, and the detection system 240 (FIGS. 3-4) analyzes the images to determine when a change from a previous image or between multiple images has occurred. In some embodiments, a first baseline image is taken before or at the beginning of a print run, and the detection system 240 can detect a disruption by comparing a second image taken during the print run to the baseline image. In further embodiments, a leak can occur between print runs, and images can be compared with a historical database of images captured from previous runs.

The detection system 240 communicates with the imaging device 230. The detection system 240 may include control system electronics that contain, for example, a processor, microcontroller, field programmable gate array (FPGA), or any combination of these. The detection system 240, which can also be referred to in this disclosure as a control system or a master control system, can include software running on a host or processing system. The detection system 240 can be embedded within the imaging device 230 or may be a separate unit that is electrically connected to the imaging device 230. Disruptions in the images can be detected in various ways such as, but not limited to, spatial changes, temporal changes, signal-to-noise ratios, local changes, and/or comparisons of pixel values against a threshold value.

In some embodiments of analyzing images for membrane failures, images from an IR imaging camera or other imaging device sensitive to the edge-lit wavelength (the wavelength of the light from the light-emitting device) are fed back to the master control system (the detection system 240) as framed pixel image data. The master control system can analyze each frame as a function of time to determine if there are changes pursuant to a failure of the substrate in the image data. When disruptions occur over an interval of time, the software of the detection system infers that a leak exists. That is, the detection system can sample the imaging data matrix at a certain time interval to look for abrupt changes (e.g., in uniformity) from previous sampled matrixed frames. The interval of time may be, for example, 15 milliseconds to 150 milliseconds, which could be based on a frame rate of the imaging device (e.g., frames per second "fps" of 6.8 fps to 60 fps).

Another embodiment for analyzing failures involves initially calibrating the imaging camera to normalize the pixel data in the absence of a leak. That is, a baseline measurement can be performed (i.e., image captured) of the membrane in an intact, non-leaking state. Once the calibration or baseline measurement has been performed, a leak can be detected by the presence of a high signal-to-noise ratio (light intensity signal compared to noise inherent to the detector when no defect is present) in the region or local area where the leaked resin contacts the substrate. That is, a leak may cause the presence of an intensity difference compared to the baseline condition. In other embodiments, disruptions relative to the presence of a non-leak state can be identified in other ways without needing to be time-based, such as spatial disruptions in, for example, intensity, color, or shape changes relative to surrounding regions in the imaged substrate, or compared to average pixel data of the overall image of the substrate, or compared to a particular threshold.

As an example of a membrane failure occurrence, a small pinhole leak may result in a disruption in pixel data (e.g., anomalous values or higher detected light intensity compared to a baseline or to neighboring values in the image) over a localized area within short or long intervals of time (spatial and temporal disruptions). Software running on the master control system will see such a localized disruption and infer that a small leak may be present at a specified X-Y location on the membrane. In another example, disruptions associated with large leaks may result in temporal or shape changes over localized or large portions of the image frame within a small interval of time (spatial and temporal disruptions). The temporal changes would increase with successive time samples. In other embodiments, changes in the shape of the disruption can be used to identify the cause, magnitude, rate of change, or other characteristics of the leak.

When a disruption is identified, actions may be taken by the detection system 240 to prevent physical damage (e.g., prevent resin from shorting out electronics or causing mechanical damage to components), minimize resin waste, and minimize lost build time. Depending on the size of the leak, the detection system may send an alert (e.g., text message, audible sound, warning light) to the user that a leak has been detected, along with including information about leak size, leak position, and leak duration. The detection system may send the alerts itself, or may be in communication with a control center of the photoreactive 3D printing system to send an alert to the control center when the disruption is detected. Different levels of alerts can be set based on the analysis performed by the software running in the detection system. For small leaks, the in-progress print may be allowed to continue unimpeded if the leak position does not intersect the part, and the operator may simply be notified of the leak. For larger leaks, the system may automatically cancel the print or prompt the operator to immediately abort the print job in order to prevent the exacerbation of the failure mode due to continued printing.

If the leak is determined to be large (e.g., membrane completely ruptured or burst), in some embodiments the system may take multiple actions in parallel. For example, in the case of a complete rupture the system may alert the user that a large leak has been detected and in parallel shut down portions of the system that may be at risk (e.g., disabling the projector power) or shut down the entire system itself. If a single printer system is part of a multi-ganged automated print system running production, programmable logic controller (PLC) electronics and industrial controls may also be used by the detection system to perform the above alert actions, along with other traditional factory elements of the 3D printing system (e.g., stack lights above the 3D printing machine, alarms or sirens, messaging on human machine interface screens at the control center, or sending automated texts or emails to an operator).

Figure 6:
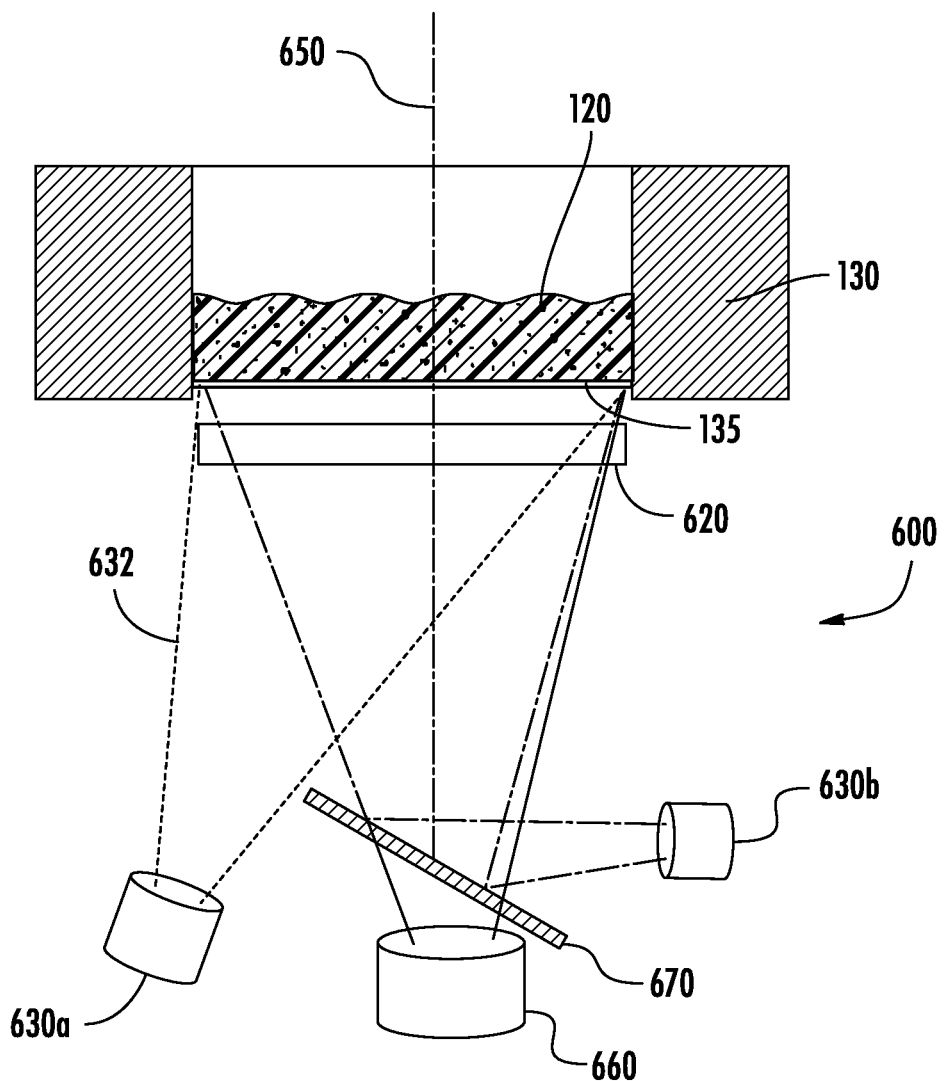
FIG. 6 is a side view schematic of placement of imaging devices for a failure detection apparatus, in accordance with some embodiments.

FIG. 6 shows non-limiting examples of imaging device arrangements that can be employed in PRPSs to capture images for detection of membrane failures. The side view shown in FIG. 6 includes a resin tub 130 holding resin 120, a membrane 135 serving as the bottom surface of resin tub 130, a substrate 620 beneath the membrane 135, imaging devices 630a and 630b, and an illumination system 660. Imaging device 630a (e.g., a camera) represents an embodiment where the camera 630a is offset from axis 650 (i.e., not positioned on axis 650), so that the camera 630a does not block the illumination (projector) system 660. Axis 650 is a central axis of the membrane 135 or substrate 620, perpendicular to the plane of the membrane 135 or substrate 620. In the embodiment of FIG. 6, illumination system 660 is aligned with the axis 650, to project patterns that will form the 3D printed part from the resin 120 in the resin tub 130. Imaging camera 630a is angled relative to axis 650 and has a field of view 632 capturing an area of the substrate 620 below the membrane 135, such as the entire planar surface of the substrate 620. In some embodiments, multiple illumination systems 660 (i.e., multiple image projectors) may be used to create a composite image on membrane 135, such as to achieve high resolution over a large build area. In such embodiments, the imaging camera 630a is offset from the axis 650 of the membrane 135 or substrate 620, and is also offset from a central axis of each illumination system 660 so as not to block each projector.

Imaging camera 630*b* of FIG. 6 represents an embodiment where a mirror 670 is utilized. Mirror 670 is positioned on the axis 650 but is angled relative to the substrate 620, reflecting the images to the imaging device 630*b*. Mirror 670 is reflective for the wavelength of light emitted by the light-emitting device into the substrate 620 and is transmissive to the photopolymerization wavelength used by the illumination system 660 (e.g., ultraviolet light). In the case of infrared light for the light-emitting device of the failure detection apparatus 600, the mirror 670 can be referred to as a "hot mirror," having a coating that reflects infrared light. Other coatings or filters can be used for the particular wavelength being employed in the imaging system, such as visible colors produced by RGB LEDs. The imaging device 630*b* is off-axis from axis 650 but receives images of the substrate 620 via mirror 670. Thus, imaging camera 630*b* is oriented toward mirror 670 rather than toward the substrate 620 as imaging camera 630*a*. In some embodiments, the optical axis of the mirror 670 may be aligned with the axis 650 of the substrate 620 such that pixels of images captured by imaging camera 630*b* can be accurately correlated with locations on the substrate 620, and subsequently correlated to locations of defects on the membrane.

In some embodiments, a failure detection apparatus for a photoreactive 3D printing system includes a substrate below a membrane of a resin tub, where the membrane is a bottom surface of the resin tub. A light-emitting device is configured to emit light into and along a plane of the substrate. The light has a wavelength that is different from a photopolymerization wavelength of resin in the resin tub. The substrate is transparent to the wavelength of the light and to the photopolymerization wavelength. An imaging device is oriented to capture an image of the light emitted from the substrate. A detection system is in communication with the imaging device, the detection system being configured to detect a spatial disruption or a temporal disruption in the image.

In certain embodiments, the spatial disruption is an area of non-uniformity in light intensity in the image. In certain embodiments, the imaging device may capture a plurality of images at a plurality of time points during a print run, where the detection system detects the temporal disruption by identifying a change between the plurality of images. In certain embodiments, the imaging device captures i) a baseline image before or at a beginning of a print run, and ii) a second image during the print run, and the detection system detects the temporal disruption by comparing the second image to the baseline image.

In certain embodiments, the failure detection apparatus further comprises a substrate holder, where the light-emitting device is coupled to a surface of the substrate holder and an edge of the substrate is supported by the substrate holder and placed adjacent to the light-emitting device. In certain embodiments, the light-emitting device is an infrared (IR) light source and the imaging device is an infrared camera. In certain embodiments, the light-emitting device is a light-emitting diode array. In certain embodiments, the substrate is a glass sheet having a sheet plane with a size equal to or greater than the plane of the membrane. In certain embodiments, the detection system is in communication with a control center of the photoreactive 3D printing system and is configured to send an alert to the control center when the disruption is detected. In certain embodiments, the failure detection apparatus further comprises a mirror, where the mirror is reflective for the wavelength of the light of the light-emitting device and transmissive for the photopolymerization wavelength, the mirror is angled relative to the substrate and reflects the image to the imaging device, and the imaging device is off-axis from a central axis perpendicular to the plane of the substrate.

Figure 7:
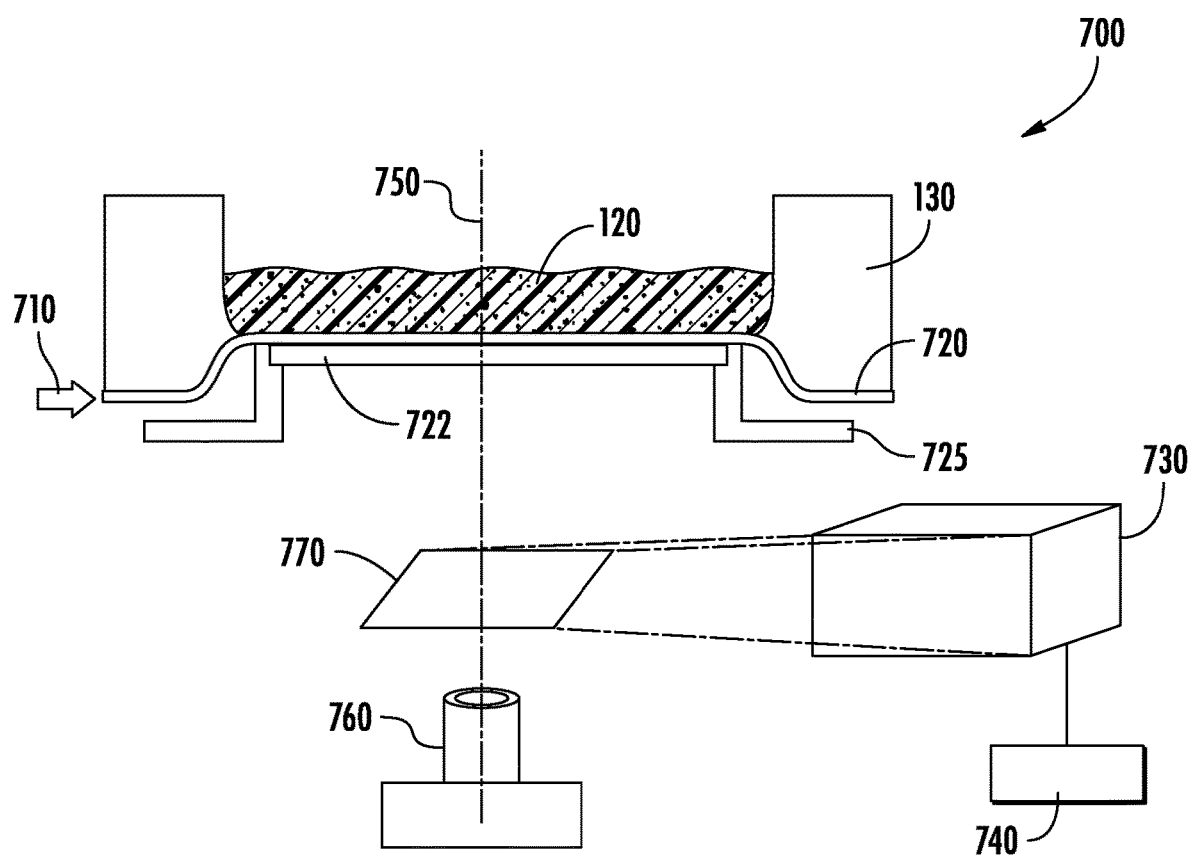
FIG. 7 is a schematic of a failure leak detection apparatus using the membrane of the resin tub as a substrate for imaging, in accordance with some embodiments.

FIG. 7 shows a further embodiment of a failure detection apparatus 700 in which light can be emitted into the membrane itself. That is, the membrane 720 can be used as the imaging substrate. The apparatus 700 is similar to apparatus 200 except that light is emitted into and imaged from the membrane 720 instead of requiring a separate substrate underneath the membrane. In this embodiment, a transparent sheet 722 is included to provide mechanical support for the membrane 720, although in other embodiments the sheet 722 can be omitted. A light-emitting device 710, such as an IR light source, may be coupled to the resin tub 130 rather than to holder 725 that holds the sheet 722 as in previous embodiments. Light-emitting device 710 is configured to emit light into and along a plane of the membrane 720, the membrane 720 being a bottom surface of the resin tub 130. The light from light-emitting device 710 has a wavelength (e.g., IR or other wavelength) that is different from a photopolymerization wavelength of resin 120 in the resin tub 130. The membrane 720 is transparent to the wavelength of the light from light emitting device 710 and transparent to the photopolymerization wavelength. A projector 760 (i.e., illumination device) projects patterns through the sheet 722 and membrane 720, into the resin 120 in the resin tub 130 to form a 3D printed part from the resin 120.

Materials for membrane 720 include, for example, Teflon® AF2400, polymethylpentene (PMP), and fluorinated ethylene propylene (FEP). The membrane 720 may be rigid or flexible, and may include a single material or multiple layers of different materials as described in relation to FIG. 2C. Membrane 720 may have a thickness that is the same as or greater than conventional membranes to facilitate propagation of light along the plane of the membrane 720.

An imaging device 730 is oriented to capture an image of the light emitted from the membrane. In the embodiment of FIG. 7, the apparatus 700 includes a mirror 770, where the mirror 770 is reflective for the wavelength of the light from the light-emitting device (e.g., the mirror may be a hot mirror for IR light) and transmissive for the photopolymerization wavelength. The mirror is angled relative to the membrane and reflects an underside image view of the membrane 720 to the imaging device 730. The imaging device is off-axis from a central axis 750 that is perpendicular to the plane of the membrane 720. A detection system 740 is in communication with the imaging device 730, where the detection system 740 is configured to analyze the image to detect a disruption of the light. For example, a disruption may be determined by a change between images captured by the imaging device 730 or by pixel data (e.g., color, intensity) exceeding a certain threshold. In some embodiments, the imaging device 730 captures a plurality of images at a plurality of time points, and the detection system detects a disruption of light in the membrane by identifying a change (e.g., a change in uniformity) between the plurality of images. The detection system 740 may also perform further image processing, in some embodiments, to discern non-defect membrane conditions (e.g., membrane deflection if a printed part adheres to the membrane) versus a leak or other defect condition. In some embodiments, the light-emitting device 710 is an infrared light source and the imaging device 730 is an infrared camera.

Figure 8A:
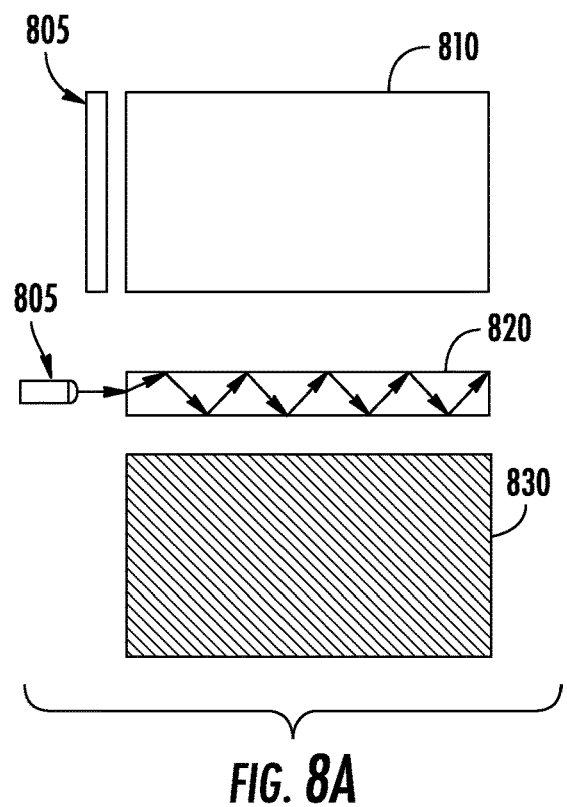
FIGS. 8A-8B show various views of using a membrane as a substrate for imaging, in accordance with some embodiments.
Figure 8B:
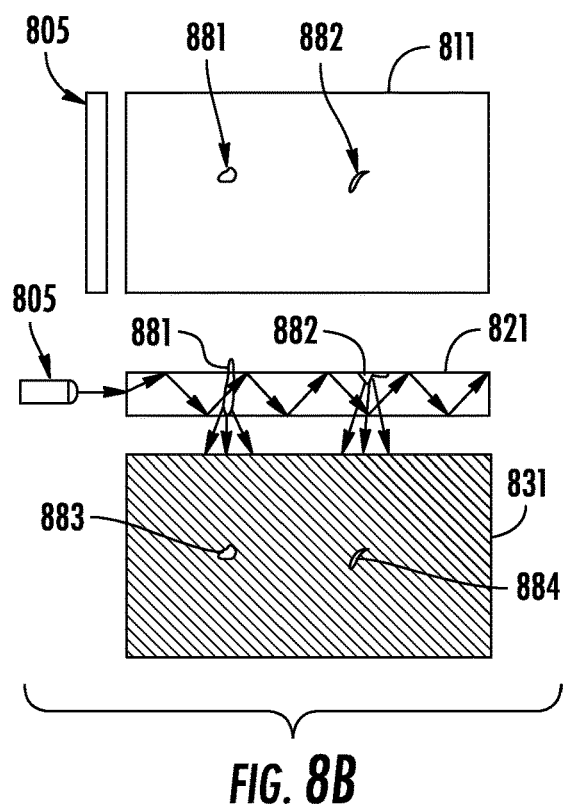

FIGS. 8A-8B show examples of successful and failed print scenarios, respectively, when the membrane itself is used as an imaging surface for the leak detection system.

FIG. 8A shows a plan view of an acceptable membrane 810 with no defects, with side view 820 of the membrane depicting how light from a light-emitting device 805 (e.g., an LED array) is contained within the membrane due to total internal reflection. Camera view 830 is an image captured by the camera (e.g., imaging device 730 of FIG. 7) where the image is free of disruptions, being mostly black with no hot spots. FIG. 8B shows a failed membrane 811 with defects such as a pinhole 881 and a dent 882. Side view 821 shows that light at these defect locations will change the direction of reflection/refraction such that light escapes from the membrane and is directed toward the camera, resulting in the appearance of hot spots 883 and 884 (white) corresponding to pinhole 881 and dent 882, respectively, in the camera view image 831. Thus, a failure in the membrane (e.g. tear or pinhole) will appear as a bright, hot spot disruption in the imaging data.

In another type of failure situation, disruptions identified by the detection system can be used to indicate failures in an object that is being produced by the 3D printing. For example, a failed print job in which some or all of a part falls or breaks off from the build tray surface into the pool of resin will appear as a bright hot spot region. In such a scenario, the fallen part sticks onto the membrane (e.g., in the form of a blob) which will result in a change (e.g., creation of a non-uniformity) in the image of the membrane. If a support sheet (e.g., glass) is present under the membrane, and the fallen part causes the membrane to deflect onto the glass, then such contact between the membrane and glass causes a change of refraction and/or reflection of an area of light that is visible by the imaging device, corresponding to the size and shape of the failed, printed part.

In some embodiments, the failure detection apparatus of the present embodiments can be used to identify defects in a membrane component itself, such as prior to its installment within a 3D printing system. For example, the failure detection apparatus can serve as a quality assurance or inspection tool to check the integrity of membranes as they are fabricated on a production line, or after they have been stored in inventory and are ready to install into a resin tub. In such scenarios, a fixture can be used to hold a membrane, and a light-emitting device (e.g., device 210 of FIG. 2 or device 710 of FIG. 7) can be coupled to the fixture to emit light within the plane of the membrane as described elsewhere in this disclosure. An imaging device can be used to check for any anomalies in the images captured (e.g., the images of FIGS. 8A-8B), to indicate any defects in the membrane. This pre-installment image can be used as a baseline signature for the membrane, against which later images can be compared during the lifetime of the membrane. Thus, edge lighting of the membrane enables the detection of defects such as dents and pinholes on the membrane, and this detection can be used during membrane production and/or development of membrane materials, as well as during print jobs.

In some embodiments, a failure detection apparatus for a photoreactive 3D printing system includes a light-emitting device configured to emit light into and along a plane of a membrane. The membrane is a bottom surface of a resin tub. The light has a wavelength that is different from a photopolymerization wavelength of resin in the resin tub, and the membrane is transparent to the wavelength of the light and to the photopolymerization wavelength. An imaging device is oriented to capture an image of the light emitted from the membrane. A detection system is in communication with the imaging device, the detection system being configured to detect a spatial disruption or a temporal disruption in the image. In certain embodiments, the light-emitting device is coupled to the resin tub. In certain embodiments, the imaging device captures a plurality of images at a plurality of time points, and the detection system detects the disruption by identifying a change between the plurality of images. In certain embodiments, the light-emitting device is an infrared light source, and the imaging device is an infrared camera. In certain embodiments, the failure detection apparatus further comprises a mirror, where the mirror is reflective for the wavelength of the light from the light-emitting device and transmissive for the photopolymerization wavelength; the mirror is angled relative to the membrane and reflects the image to the imaging device; and the imaging device is off-axis from a central axis perpendicular to the plane of the membrane.

FIGS. 9A, 9B and 9C represent yet further embodiments in which imaging of both the membrane and substrate can be utilized, where different wavelengths of light are used for each. For example, one wavelength ("wavelength 1") can be used to image the membrane 910, and a second, different wavelength ("wavelength 2") can be used for the substrate 912 underneath the membrane 910. In some embodiments, wavelength 1 may be IR light and wavelength 2 may be visible light, as long as both wavelengths are different from the photopolymerization wavelength. In one non-limiting example, wavelength 1 may be red light (approximately 680 nm) and wavelength 2 may be IR light (e.g., 700 nm to 1000 nm, such as 750 nm). The imaging device (not shown) is configured to have the ability to read both wavelengths. The two wavelengths could be employed to distinguish between a failed printed object that has fallen into the resin pool versus a failed membrane. The membrane 910 and substrate 912 are positioned close to each other such that if membrane 910 deflects, membrane 910 will contact substrate 912.

In each of FIGS. 9A-9C, the upper schematics show a resin pool 920 and a 3D printed part on a build tray 940. The middle schematics are side views of the membrane 910 and substrate 912 (e.g., glass) being edge-lit by two different wavelengths of light. The lower schematics are camera views of the membrane 910 and support substrate 912. FIG. 9A illustrates a successful print of a 3D printed part 931, where the camera image 951 is uniform, without any disruptions in the image. FIG. 9B illustrates a failed print scenario where a broken portion 932*b* of a printed part 932*a* detaches and appears as a resin "blob" stuck to the membrane 910. The camera image 952 of wavelength 1 shows the shape 955 of the blob due to the disruption of light from contact of the resin (from broken part 932*b*) with the membrane 910. That is, in the area(s) where the broken part 932*b* contacts the membrane 910, the light of wavelength 1 will reflect or refract differently than in areas where no broken part 932*b* is present. For example, the light intensity where the broken part 932*b* is present may be greater or less than in other regions of the substrate image.

FIG. 9C is a scenario where both a 3D printed part 933*a* and the membrane 910 have failed, where a broken piece 933*b* of the printed part 933*a* adheres to the membrane and the membrane 910 has a tear 915. The camera view 953 of FIG. 9C shows that the failed part would be identified by the camera using wavelength 1 ("$\lambda_1$") of the membrane, while the tear causing resin leaking through to the support substrate would be identified using wavelength 2 ("$\lambda_2$"). The broken part 933*b* would be detected as described in FIG. 9B while the tear 915 would be detected due to the presence of resin seeping in between membrane 910 and substrate 912, thus changing the refraction and/or reflection of the wavelength 2 light. Note that although the failure conditions caused by the broken part 932b and tear 915 are in different locations for clarity of illustration in FIG. 9C, the failure conditions could overlap in location. In such scenarios, the failure detection apparatus would be able to differentiate between the two types of failures due to the different wavelengths being used. In various embodiments using different wavelengths, it is possible that the wavelength used in the membrane may pass into the support substrate or vice versa, but a light signal from a disruption will typically be large enough to be differentiated by the imaging device from any mixing in wavelengths.

Figure 10:
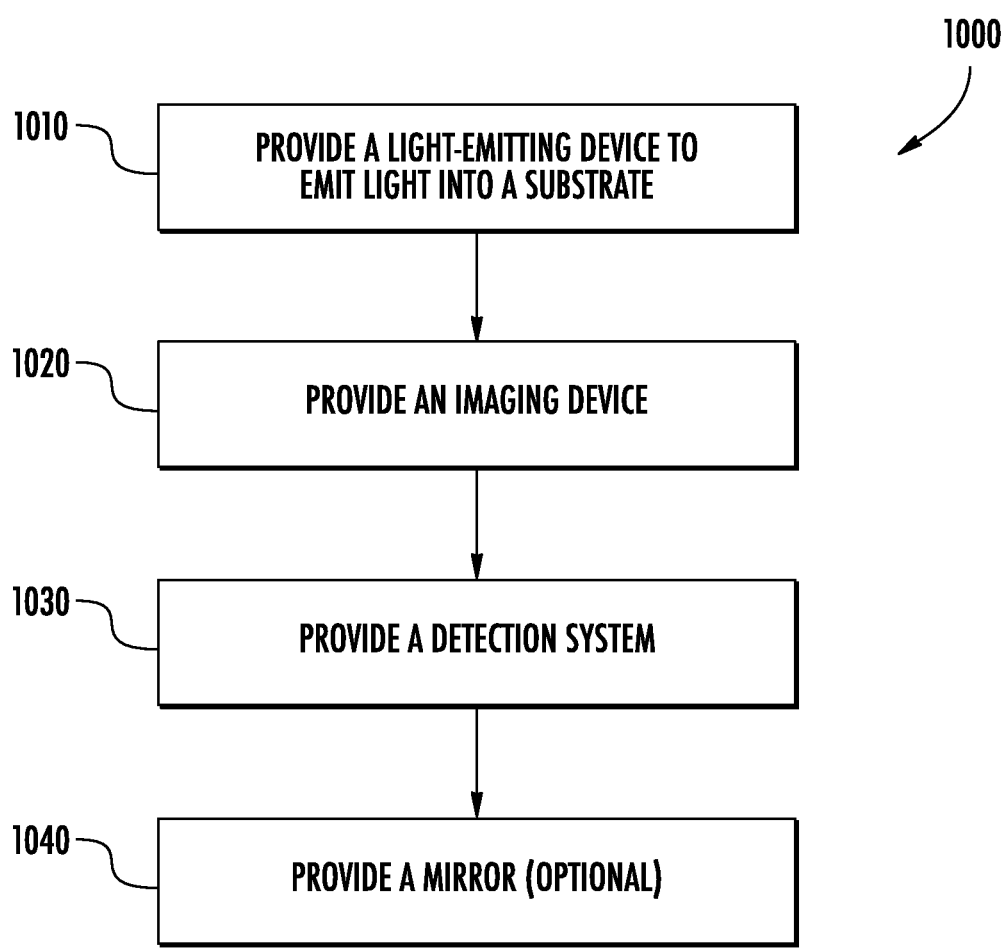
FIG. 10 is a flowchart representing methods for detecting failures in a 3D printing system, in accordance with some embodiments.

FIG. 10 is a flowchart 1000 representing methods for detecting failures in a photoreactive 3D printing system using the apparatuses disclosed herein. In step 1010 a light-emitting device is provided, where the light-emitting device is configured to emit light into and along a plane of a substrate. In some embodiments, step 1010 includes mounting the light-emitting device at an edge of the substrate. The substrate may be mounted onto or below a resin tub. For example, as described in relation to FIG. 2, the substrate can be a separate component separate from the membrane—a substrate mounted below the resin tub. In another example, as described in relation to FIG. 7, the substrate can be the membrane itself—mounted onto the resin tub and serving as a bottom surface of a resin tub. The light from the light-emitting device has a wavelength that is different from a photopolymerization wavelength of resin in the resin tub. The substrate is transparent to the wavelength of the light and to the photopolymerization wavelength.

Step 1020 involves providing an imaging device that is oriented to capture an image of the light emitted from the substrate. The imaging device can be configured to capture a plurality of images at a plurality of time points. Step 1030 involves providing a detection system in communication with the imaging device, the detection system being configured to detect a spatial disruption or a temporal disruption in the image. The detection system can be configured to detect a temporal disruption by identifying a change (e.g., in uniformity or from a baseline) between the plurality of images.

In some embodiments of flowchart 1000, a mirror can be provided in optional step 1040. The mirror is reflective for the wavelength of the light from the light-emitting device and transmissive for the photopolymerization wavelength. The mirror is angled relative to the substrate (which can be the membrane) and reflects the images to the imaging device. The imaging device is off-axis from a central axis perpendicular to the plane of the substrate.

In some embodiments of flowchart 1000, the substrate is mounted below a membrane of the resin tub, with the membrane serving as a bottom surface of the resin tub. The method includes providing a second light-emitting device configured to emit light of a second wavelength into and along a plane of the membrane, the second wavelength being different from the wavelength of the light-emitting device that emits light into the substrate.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A failure detection apparatus for a photoreactive 3D printing system, the apparatus comprising:
    a light-emitting device configured to emit light into and along a plane of a membrane, the membrane being a bottom surface of a resin tub, wherein the light has a wavelength that is different from a photopolymerization wavelength of resin in the resin tub, and wherein the membrane is transparent to the wavelength of the light and to the photopolymerization wavelength;
    an imaging device oriented to capture an image of light emitted from the membrane; and
    a detection system in communication with the imaging device, the detection system being configured to detect a spatial disruption or a temporal disruption in the image.

2. The apparatus of claim 1, wherein the spatial disruption is an area of non-uniformity in light intensity in the image.

3. The apparatus of claim 1, wherein:
    the imaging device captures a plurality of images at a plurality of time points; and
    the detection system detects the temporal disruption by identifying a change between the plurality of images.

4. The apparatus of claim 1, wherein the light-emitting device is an infrared (IR) light source and the imaging device is an infrared camera.

5. The apparatus of claim 1, further comprising a mirror, wherein:
    the mirror is reflective for the wavelength of the light from the light-emitting device and transmissive for the photopolymerization wavelength;
    the mirror is angled relative to the membrane and reflects the image to the imaging device; and
    the imaging device is off-axis from a central axis perpendicular to the plane of the membrane.

6. A failure detection apparatus for a photoreactive 3D printing system, the apparatus comprising:
    a substrate below a membrane of a resin tub, wherein the membrane is a bottom surface of the resin tub;
    a light-emitting device configured to emit light into and along a plane of the substrate, wherein the light has a wavelength that is different from a photopolymerization wavelength of resin in the resin tub, and wherein the substrate is transparent to the wavelength of the light and to the photopolymerization wavelength;
    an imaging device oriented to capture an image of light emitted from the substrate; and
    a detection system in communication with the imaging device, the detection system being configured to detect a spatial disruption or a temporal disruption in the image.

7. The apparatus of claim 6, wherein the spatial disruption is an area of non-uniformity in light intensity in the image.

8. The apparatus of claim 6, wherein:
    the imaging device captures a plurality of images at a plurality of time points during a print run; and the detection system detects the temporal disruption by identifying a change between the plurality of images.

9. The apparatus of claim 6, wherein:
the imaging device captures i) a baseline image before or at a beginning of a print run, and ii) a second image during the print run; and
the detection system detects the temporal disruption by comparing the second image to the baseline image.

10. The apparatus of claim 6, further comprising a substrate holder, wherein:
the light-emitting device is coupled to a surface of the substrate holder; and
an edge of the substrate is supported by the substrate holder and placed adjacent to the light-emitting device.

11. The apparatus of claim 6, wherein the light-emitting device is an infrared (IR) light source and the imaging device is an infrared camera.

12. The apparatus of claim 6, wherein the substrate is a glass sheet having a sheet plane with a size equal to or greater than the plane of the membrane.

13. The apparatus of claim 6, wherein the detection system is in communication with a control center of the photoreactive 3D printing system and is configured to send an alert to the control center when the spatial disruption or the temporal disruption is detected.

14. The apparatus of claim 6, further comprising a mirror, wherein:
the mirror is reflective for the wavelength of the light of the light-emitting device and transmissive for the photopolymerization wavelength;
the mirror is angled relative to the substrate and reflects the image to the imaging device; and
the imaging device is off-axis from a central axis perpendicular to the plane of the substrate.

15. A method for detecting failures in a photoreactive 3D printing system, the method comprising:
providing a light-emitting device configured to emit light into and along a plane of a substrate, the substrate mounted onto or below a resin tub, wherein the light has a wavelength that is different from a photopolymerization wavelength of resin in the resin tub, and wherein the substrate is transparent to the wavelength of the light and to the photopolymerization wavelength;
providing an imaging device oriented to capture an image of light emitted from the substrate; and
providing a detection system in communication with the imaging device, the detection system being configured to detect a spatial disruption or a temporal disruption in the image.

16. The method of claim 15, wherein the substrate is a membrane serving as a bottom surface of the resin tub.

17. The method of claim 15, wherein providing the light-emitting device comprises mounting the light-emitting device at an edge of the substrate.

18. The method of claim 15, further comprising:
configuring the imaging device to capture a plurality of images at a plurality of time points; and
configuring the detection system to detect the temporal disruption by identifying a change between the plurality of images.

19. The method of claim 15, further comprising providing a mirror, wherein:
the mirror is reflective for the wavelength of the light from the light-emitting device and transmissive for the photopolymerization wavelength;
the mirror is angled relative to the substrate and reflects the image to the imaging device; and
the imaging device is off-axis from a central axis perpendicular to the plane of the substrate.

20. The method of claim 15, wherein:
the substrate is mounted below a membrane of the resin tub, the membrane serving as a bottom surface of the resin tub; and
the method further comprises providing a second light-emitting device configured to emit light of a second wavelength into and along a plane of the membrane, the second wavelength being different from the wavelength of the light-emitting device that emits light into the substrate.

* * * * *